Dec. 6, 1938.  W. T. WELLS  2,139,105
PRESSURE INDICATION WITHIN WELL BORES
Filed June 4, 1936  3 Sheets-Sheet 1
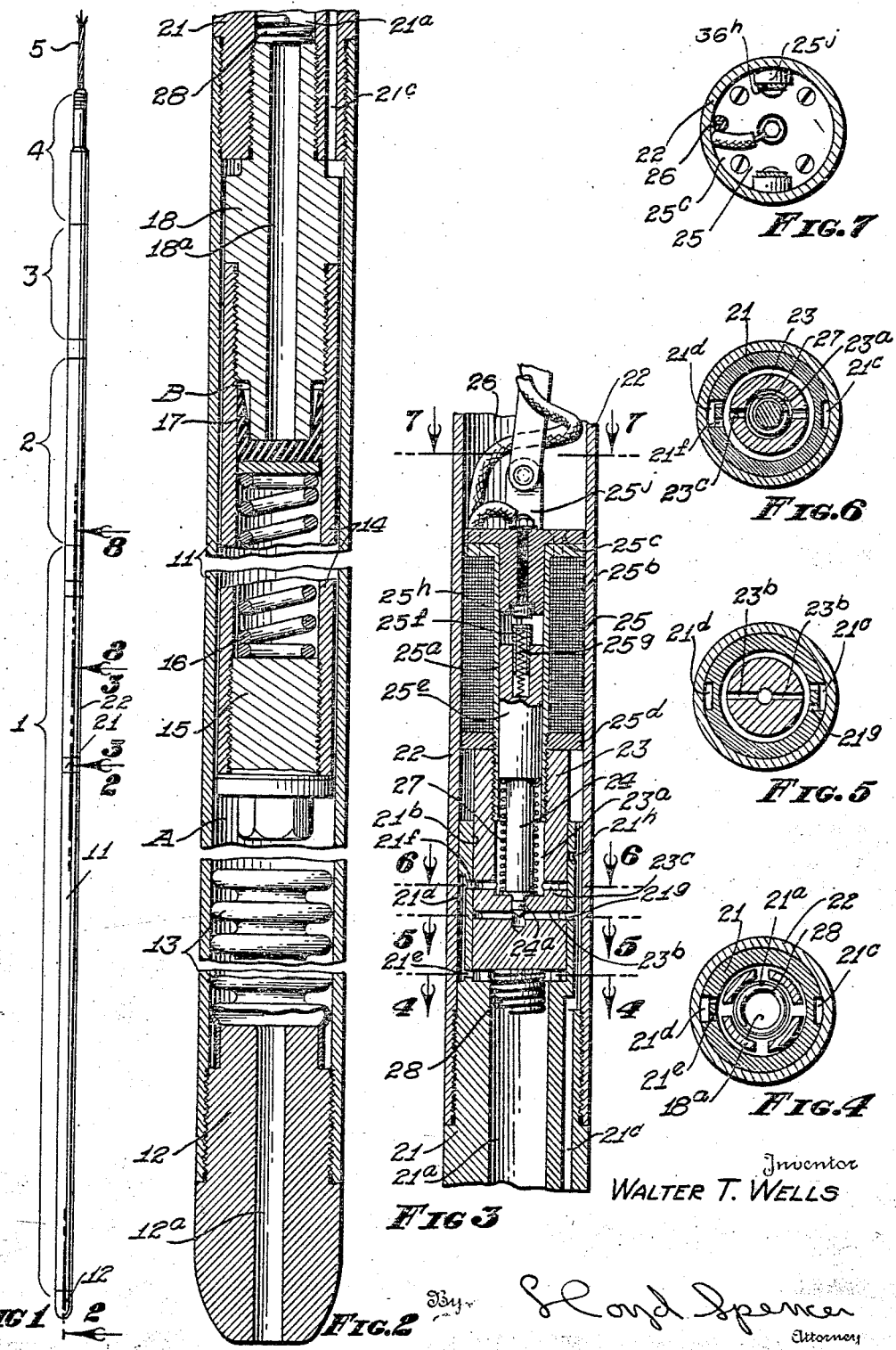
Inventor
WALTER T. WELLS
By Lloyd Spencer
Attorney

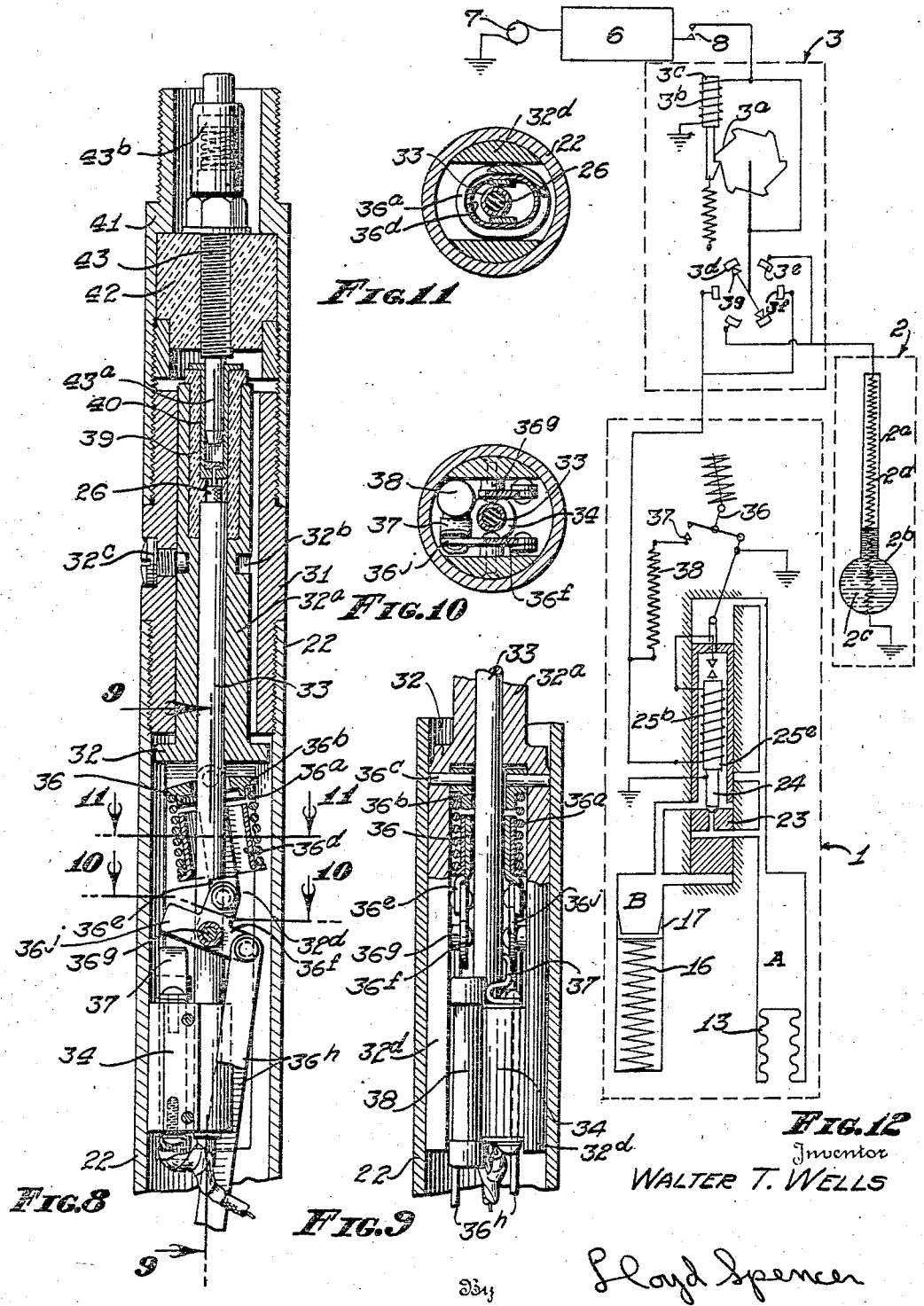

Dec. 6, 1938. W. T. WELLS 2,139,105
PRESSURE INDICATION WITHIN WELL BORES
Filed June 4, 1936 3 Sheets-Sheet 3
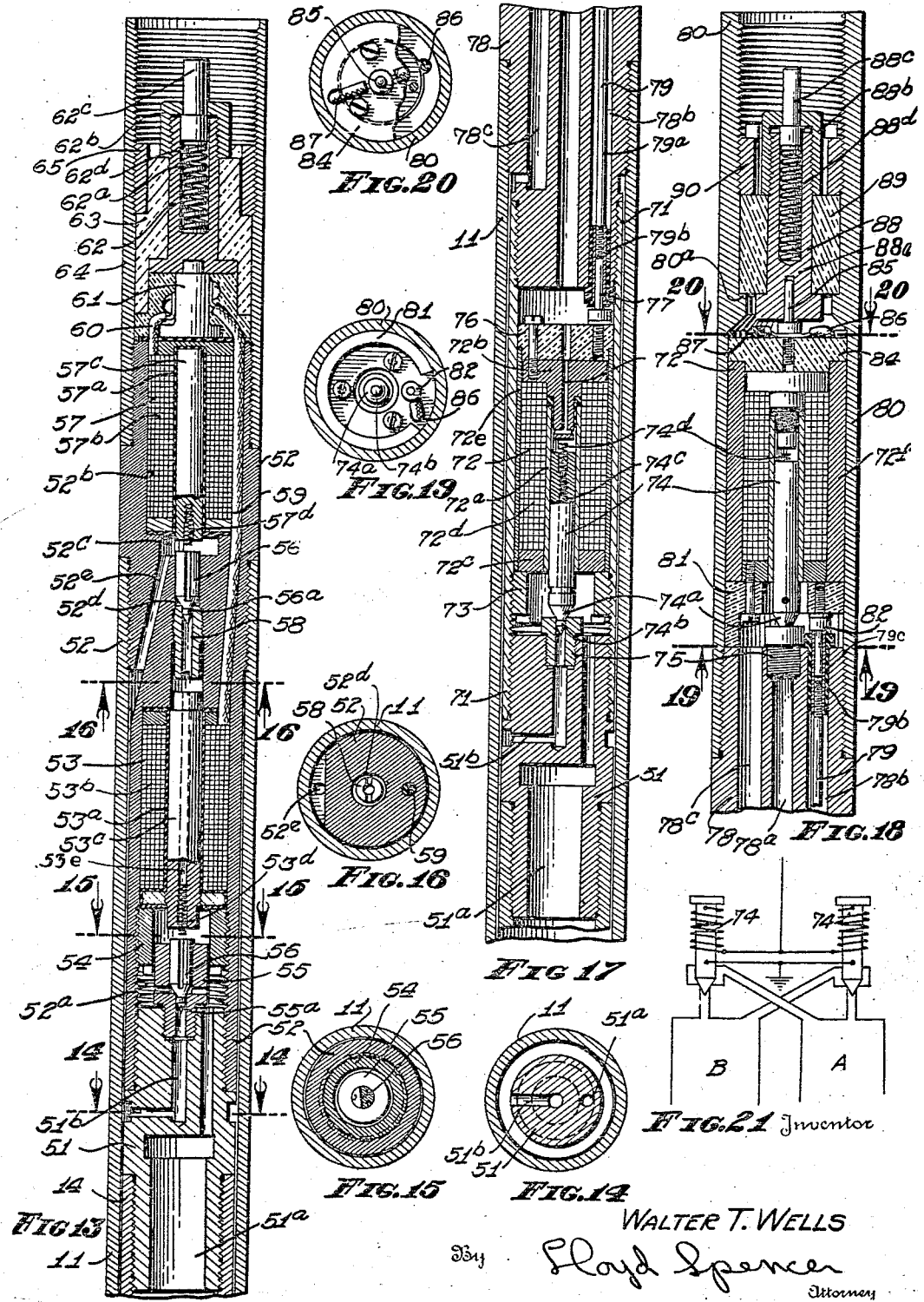
Walter T. Wells
By Lloyd Spencer
Attorney Patented Dec. 6, 1938

2,139,105

UNITED STATES PATENT OFFICE 2,139,105

PRESSURE INDICATION WITHIN WELL BORES

Walter T. Wells, Glendale, Calif., assignor to Lane-Wells Company, Los Angeles, Calif., a corporation of Delaware Application June 4, 1936, Serial No. 83,425

11 Claims. (Cl. 73—300).

This invention relates to pressure indication within well bores, and among the objects of this invention are:

First, to provide an electrically operated pressure gauge which is adapted to be lowered into a well bore on a conductor cable.

Second, to provide a pressure gauge which may be employed to measure pressures while descending or ascending in a well bore, or while at rest at any point in the well bore.

Third, to provide a pressure gauge of this character which is particularly designed for use in conjunction with electrical recording equipment positioned at the surface of the well so that pressure variations in the well may be immediately recorded or observed at the surface, thereby providing a pressure gauge which may be used to test pressure changes caused by flow variations in the well.

Fourth, to provide a pressure gauge having a particularly small diameter so that it may be lowered into a flowing well without materially affecting the flow therefrom.

Fifth, to provide a pressure gauge wherein liquid is metered from one chamber to another upon a predetermined variation in the pressure of the liquid in which the gauge is submerged, and which is so arranged that such metering causes an electrical impulse to be transmitted to the surface for recording.

Sixth, to provide a pressure gauge of this character wherein the pressure differential between the interior of the pressure gauge and the hydrostatic pressure of the liquid in which it is submerged may be maintained within a few pounds or ounces so that leakage or other detrimental factors caused by excessive pressure differential are eliminated.

Seventh, to provide a pressure gauge of this character which incorporates a novel dual valve construction whereby increasing or decreasing or fluctuating pressures may be measured.

Eighth, to provide a pressure gauge which requires but a single conductor and is so arranged that it need not be continuously connected with said conductor whereby an electrically operated temperature gauge may be associated with the pressure gauge and the two operated alternately.

Ninth, to provide a novel method of measuring pressures which involves measuring predetermined increments of pressure as distinguished from the total pressure.

With the above and other objects in view as may appear hereinafter, reference is made to the accompanying drawings, in which:

Figs. 1 through 12 illustrate one form of my pressure gauge in which a single magnetically operated check valve is operated in conjunction with a sleeve valve in order to meter in either direction from a pair of chambers.

Fig. 1 is an elevational view of the pressure gauge and associated mechanism with the supporting cable shown fragmentarily.

Fig. 2 is an enlarged, fragmentary, sectional view through 2—2 of Fig. 1.

Fig. 3 is a similar fragmentary, longitudinal, sectional view taken through 3—3 of Fig. 1 and continuing from Fig. 2.

Figs. 4, 5, and 6 are transverse sectional views through 4—4, 5—5, and 6—6 respectively of Fig. 3 illustrating particularly the valve mechanism of the pressure gauge.

Fig. 7 is another transverse sectional view looking downward upon the magnet unit and taken through 7—7 of Fig. 3.

Fig. 8 is a longitudinal sectional view through 8—8 of Fig. 1 and forms a continuation of Fig. 3.

Fig. 9 is a fragmentary, longitudinal, sectional view taken through 9—9 of Fig. 8.

Figs. 10 and 11 are transverse sectional views through 10—10 and 11—11 respectively of Fig. 8 illustrating the snap acting mechanism.

Fig. 12 is a diagrammatic view of the pressure gauge controller and surface equipment.

Figs. 13 through 16 illustrate a modified form of my pressure gauge in which two magnetic check valves are employed; these being arranged to meter in opposite directions between two chambers.

Fig. 13 is a longitudinal sectional view thereof similar to Fig. 3.

Fig. 14 is a transverse sectional view through 14—14 of Fig. 13.

Fig. 15 is another transverse sectional view through 15—15 of Fig. 13.

Fig. 16 is also a transverse sectional view through 16—16 of Fig. 13.

Figs. 17 through 21 illustrate a further modified form which is similar to Fig. 13 except that the check valves operate in a different manner.

Fig. 17 is a fragmentary, longitudinal, sectional view thereof.

Fig. 18 is another fragmentary, longitudinal, sectional view continuing from Fig. 17.

Fig. 19 is a transverse sectional view through 19—19 of Fig. 18 showing the magnetic valve in elevation and illustrating the bottom end thereof.

Fig. 20 is another transverse sectional view through 20—20 of Fig. 18 and also shows the magnetic valve in elevation and illustrates the top thereof; the insulating block, however, being partially broken away.

Fig. 21 is a fragmentary, diagrammatic view illustrating the mode of operation of the pressure gauge represented in Figs. 13, 17 and 18.

The pressure gauge comprises generally the pressure gauge per se, designated 1; temperature gauge 2; a controller 3; cable head 4; conductor core cable 5; a suitable amplifier and recording or indicating mechanism 6 located at the surface; a source of power 7; and a switch 8 either automatically or manually controlled and interposed in the line leading to the amplifier.

Because of the error introduced into any recording instrument by temperature, it is necessary or at least desirable for accurate pressure recording or gauging to incorporate a temperature gauge. Such a temperature gauge is illustrated in Fig. 12 and comprises a stem $2a$ and bulb $2b$ in which is sealed an expansible conducting fluid $2c$ and a resistance wire $2d$ in such a manner that as the temperature rises successive sections of the resistance wire are shorted out.

The pressure gauge, as will be brought out hereinafter, is designed to operate intermittently so that between such intervals the temperature may be measured. To facilitate this, the controller 3 incorporates a ratchet and pawl means $3a$, a solenoid $3b$, an armature $3c$ attached to the pawl of the ratchet and pawl means, and suitable contacts $3d$, $3e$, and $3f$ engaged by a sweeper arm $3g$. The contact or set of contacts $3d$ are preferably open so that when the sweeper arm is so positioned, only the solenoid $3b$ and cable 5 are in the circuit, while contacts $3e$ are connected with the temperature gauge, and contacts $3f$ are connected with the pressure gauge. The solenoid $3b$ of the controller is in parallel with the two circuits associated with the contacts and sweeper arm, so that as the circuit is made and broken at the surface, the resistances of the cable 5, solenoid $3b$, temperature gauge 2, and the pressure gauge 1 may be measured successively.

Except as to their general combinative relationship with the pressure gauge, the temperature gauge and controller form no part of the present invention.

Reference is now directed to Figs. 2 through 12 which illustrate one form of the pressure gauge. An outer chamber tube 11 is provided which is internally threaded at its lower end to receive a plug 12 having a bore $12a$ therethrough. Over the inner end of the plug is fitted an elongated bellows diaphragm 13, the interior of which is exposed to the well fluid through the bore $12a$ and the exterior of which is exposed to the outer chamber defined by tube 11.

Fitted within the tube 11 is an inner chamber tube 14 which clears the inner wall of the outer chamber tube to insure a fluid passage therebetween. The inner chamber tube 14 receives a sealing plug 15 upon which rests a stiff spring 16. Above this spring the inner chamber tube 14 receives a piston 17 designed to be urged downwardly by liquid pressure against the spring while preventing the passage of liquid. The upper end of the inner chamber tube 14 is internally threaded to receive a coupling 18 which likewise clears the inner walls of the outer chamber tube and is provided with a central bore $18a$.

A sleeve valve body 21 having external threads at its lower portion screws into the upper end of the outer chamber tube 11. The sleeve valve body is provided with a central bore $21a$, the lower end of which is internally threaded to receive and support the coupling 18 as well as the inner chamber tube 14. The upper end of the central bore is enlarged to define a sleeve valve bore $21b$. This end of the sleeve valve body fits snugly within a casing 22 which is screw-threaded to the sleeve valve body at a point below the sleeve valve bore $21b$.

The sleeve valve body is provided with a by-pass $21c$ extending the length thereof. The lower end of the by-pass communicates with the outer chamber A through the passage formed between the tubes 11 and 14. The upper end of the by-pass is in the form of a channel extending along the interior of the casing 22. Diametrically opposite this portion of the by-pass $21c$, the sleeve valve body is provided with a short connecting channel $21d$. The lower end of the connecting channel $21d$ connects through a port $21e$ to the central bore $21a$, while the upper end communicates through a port $21f$ with the sleeve valve bore $21b$. At points below and above the port $21f$, respectively, the by-pass $21c$ communicates with the sleeve valve bore through ports $21g$ and $21h$.

The sleeve valve bore $21b$ receives a sleeve valve 23 having a check valve socket $23a$ extending therein from its upper end. The lower end of the check valve socket is constricted to form a valve seat, and below the constriction it is provided with intake ports $23b$ adapted to communicate with either the port $21f$ or $21g$, depending on the position of the sleeve valve. Above the constriction, the sleeve valve is provided with outlet ports $23c$ which communicate with either the port $21f$ or $21h$. The socket $23a$ receives a check valve 24 which fits in the lower end to control flow from ports $23c$ to $23b$. In order to insure a predetermined movement of the check valve before materially opening communication between these ports, the lower end of the check valve is provided with a piston tip $24a$.

Mounted upon the sleeve valve 23 is a magnet unit 25. The magnet unit comprises a hollow solenoid mandrel $25a$, the lower end of which screws into the sleeve valve. A solenoid $25b$ surrounds the mandrel. The upper end of the solenoid is covered by a pole piece $25c$ which extends into the mandrel, and below the solenoid the mandrel receives a pole ring $25d$. In addition to the pole piece and pole ring, the casing 22 is made out of magnetic material so as to provide the maximum magnetic path.

The upper end of the check valve 24 is secured to an armature $25e$ which fits within the mandrel $25a$ and carries a contactor $25f$ urged upwardly by a contactor spring $25g$. The contactor $25f$ is adapted to engage a ground terminal $25h$ carried by, but insulated from, the pole piece $25c$. The terminal $25h$ is connected to one end of the solenoid while a supply lead 26 is connected to the other end thereof. The magnet unit is loosely fitted in the casing 22 so that liquid may flow therearound.

In order to minimize the amount of pressure necessary to raise the check valve and to enable the intake side thereof to be as small as possible, a counterbalancing spring 27 may be provided which partially supports the weight of the check valve and armature. This spring also aids in insuring a grounding contact between the armature and sleeve valve; it being borne in mind that the armature fits loosely within the mandrel or is provided with channels to permit flow of fluid into and out of the chamber formed between the pole piece and armature.

Likewise the weight of the sleeve valve and magnet unit may be partially supported by a counterbalancing spring 28 mounted within the bore 21a of the sleeve valve body and resting on the upper end of the coupling 18.

The upper end of the casing 22 screws onto a coupling 31. The coupling 31 is provided with a bore therethrough which receives the stem 32a of a supporting frame 32. The stem 32a is provided with a groove 32b which is engaged by a set screw 32c extending inwardly through the side of the coupling 31. The lower end of the supporting frame 32 extends within the casing 22 and is provided with a yoke 32d. A conductor tube 33 is supported in the stem 32a and depends between the legs of the yoke 32d. The lower end of the conductor tube fits in a resistor mounting block 34 supported between the lower ends of the yoke.

A snap-acting mechanism 36 is mounted within the casing 22 and is supported by the frame 32. The snap-acting mechanism includes an over-center spring 36a, preferably of oval form, which fits around the conductor tube 33 and bears against a base ring 36b journaled by pins 36c adjacent the upper extremity of the yoke 32d. A sleeve 36d flanged at its lower end and provided with lugs 36e fits within the spring. The lugs are pivotally connected to bell cranks 36f mounted on journal pins 36g, as shown best in Fig. 10. The bell cranks are in turn joined to connecting bars 36h, which are in turn joined to lugs 25j extending upwardly from the magnet unit 25. The over-center mechanism is arranged to urge the sleeve valve into either of its two positions. In addition, one of the bell cranks is provided with a contact arm 36j which is adapted to engage a terminal 37 supported from the block 34 and connected with a resistor 38. When the sleeve valve is in its lower position, as shown in Fig. 3, the over-center mechanism is in the position shown in Fig. 8; but upon raising of the valve, the over-center mechanism shifts so that the contact arm engages the terminal of the resistor. The other end of the resistor is connected to the supply lead 26, as shown in Fig. 12. Thus, for the upper position of the sleeve valve, the resistor is in parallel with the solenoid; and in the lower position, the resistor is disconnected.

The upper end of the supporting frame 32 receives an insulating sleeve 39 in which is positioned a contact socket 40. The upper end of the coupling 31 receives a hollow adapter fitting 41 in which is mounted a sealing and insulating block 42 which carries a terminal plug 43. The terminal plug 43 has a prong 43a adapted to fit the socket 40 and a yieldable contact 43b engageable with whatever unit is attached to the top of the pressure gauge. The contact socket 40 is joined to the upper end of the supply lead 26.

The entire space within the pressure gauge except for the chamber below the piston 17 is filled with a non-conducting liquid.

The gauge may be employed in two ways; first, in measuring the increment in well pressure as the gauge is lowered in well fluid so as to determine the segregation of fluids therein; and secondly, to measure the variation in pressure at a fixed location. In either event, it is not the purpose to measure rapid variations in pressure.

In the first instance, the gauge is lowered slowly in a well bore or in stages. Under these conditions, the pressure is increasing and the sleeve valve occupies its lower position so that the check valve 24 controls liquid flow from chamber A to chamber B. When the pressure in chamber A exceeds that in chamber B a predetermined amount, such pressure raises the check valve 24 and a grounding contact is made with the terminal 25h. This completes the circuit through the solenoid and causes the check valve to be further raised and held as long as the circuit is complete.

The circuit is maintained completed for an arbitrary interval calculated to permit flow from chamber A to chamber B until their pressures equalize. This interval may be quite short because only a small quantity of fluid need transfer.

The circuit is then broken by switch 8 at the surface which permits the check valve to again close the passage between chambers A and B until the predetermined pressure differential is again reached. This is repeated and the number of cycles of operation times the predetermined pressure differential for which the check valve is calibrated gives the total pressure.

Any change in outside pressure against chamber A during the intervals in which the check valve is open introduces an error in the calculations. This error may be compensated for in two ways.

First, the gauge may be lowered until an ammeter or the like associated with the amplifier indicates that the circuit is closed; whereupon, the descent of the gauge is stopped and the outside pressure remains substantially constant.

Secondly, the gauge may be lowered at a uniform rate, providing that flow induced by pressure increase when the check valve is open is materially less than the capacity of the passage between chambers A and B. If this is done, the distance traveled while the check valve is open is determinable. Also, the distance traveled before the valve opened is determinable. By assuming that the pressure increase for the entire distance is uniform, it is a simple matter to calculate the error introduced by the pressure change when the valve was open. For example, assume that the check valve opens when the pressure differential reaches five pounds; that the gauge was lowered ten feet before the check valve opened, and was lowered an additional two feet before the check valve was closed. The gauge then indicates that in ten feet the pressure rose five pounds or one-half pound for each foot. By adding one-half pound per foot traveled while the valve was open, we obtain the answer of six pounds for the twelve feet traveled.

Of course the above calculations may be made automatically by suitable means which form no part of the present invention, or the depths traveled between operations of the valve and the open intervals thereof, specifically, may be recorded for later interpretation.

In ascending, the operation may be reversed for during initial ascent pressure is lowered in chamber A until the pressure in chamber B forces the sleeve valve into a position reversing the connection between the two chambers, whereupon the check valve now responds to flow of liquid from chamber B to chamber A. In this connection, it should be noted that the sleeve valve is a balanced one, and by reason of bypass 21c is subjected to the pressure in chamber A.

The pressure differential and fluid exchange necessary to effect shifting of the sleeve valve is a known element and can be compensated for in calculations. Once the sleeve valve is reversed, the operation is the same as above except that the gauge indicates decreases in pressure.

When the gauge is to be operated at a fixed position in a well, it may be lowered as described before, in which case the gauge permits determination of the initial pressure as well as the fluctuations therefrom.

Decrease in pressure is distinguished from increase by reason of the resistor 38 being incorporated in the circuit when flow is from chamber B to chamber A.

Often, however, it is merely fluctuation of pressure rather than absolute pressure that is desired; in which case the check valve may be held open until the gauge is in position, then allowed to operate in the normal manner. Here also compensation for the intervals during which the check valve is open may be made by assuming that the pressure change is at the same rate as that occurring during the preceding closed intervals of the check valve. Of course, fluctuations which are less in magnitude than the unit for which the gauge is calculated are not measurable.

During the intervals that the check valve is closed, the connection may be made for temperature and cable resistance readings.

Reference is now made to the construction shown in Figs. 13 through 16. The structure here illustrated is connected by a coupling 51 to the inner chamber tube 14 in place of the coupling 18. The coupling 51 is in turn secured into a bottom socket 52a formed in a body member 52 which extends downwardly into the outer chamber tube 11 and is externally threaded near its upper portion to receive the same.

A magnet unit 53 is fitted within the socket 52a above the coupling 51 and is held there by a retainer ring 54. The magnet unit comprises a mandrel 53a of insulating material around which is wound a solenoid 53b, and in which is fixed a core 53c; the core being insulated and electrically connected with one end of the solenoid coil.

The coupling 51 is provided with an inner chamber passage 51a which communicates with chamber B and intersects the socket 52a eccentrically. The coupling is also provided with an outer chamber passage 51b communicating with the chamber A and intersecting the socket 52a in centered relation therewith. The passage 51b receives a check valve seat member 55 in which is mounted a check valve 56 in the form of a short plunger pointed at its lower end. The check valve seat member extends upwardly from its valve seat around the check valve to form a guide therefor. The body member 52, retaining ring 54, and seat member 55 are preferably formed of magnetic material, as is also the check valve itself. The check valve is positioned in contiguously spaced relation with the core 53c of the magnet, and is provided with a plunger tip 55a at its lower end so that the valve tends to raise a predetermined distance before opening and, in so moving, engages a contact spring 53d protruding from the lower end of the core 53c, so that upon engagement of the check valve with the spring, the magnet is grounded and the circuit completed therethrough.

The upper end of the body member is provided with an upper socket 52b which also receives a magnet unit 57 having an insulation mandrel 57a, solenoid 57b, and insulated core 57c connected with one end of the solenoid as in the case of the magnet unit 53. Below the socket 52b, a chamber 52c is formed in the body member and is connected by a central passage or bore 52d with the lower socket 52a. The core 53c of the lower magnet unit is provided with a bore 53e therethrough so that a passage extends from the bore 51a through the lower magnet unit to the chamber 52c. A port 52e communicates between the chamber 52c and the exterior of the body member within the outer chamber tube 11 so that chamber 52c communicates with chamber A.

The bore 52d receives a valve seat member 58, the upper end of which has a valve seat engageable by a second check valve 56, the tip of which fits within the valve seat member.

The core 53c is preferably made larger in diameter than the valve seat member 58 and the check valve; also, this core is removable from the lower magnet unit without disturbing the remaining elements thereof. By disconnecting the coupling 51 from the body 52, it is possible to remove the core 53c, valve seat member 58, and the upper check valve 56 so that the entire valve assembly may be removed or replaced without disturbing the mounting of the magnets within the body member.

A passageway is provided in the body member for a lead 59 extending from the lower magnet unit upwardly along and past the upper magnet unit; also, a lead 60 extends from the upper magnet unit. The two leads are joined to a spacer terminal 61 which in turn joins a terminal means 62 comprising a socket member 62a having a cap 62b which retains a contact pin 62c urged upwardly by a spring 62d. The terminal means is mounted in an insulating block 63 which fits within a sleeve 64 screw-threaded to the upper end of the body member 52. The insulating block is held in place by a retainer ring 65 which causes the terminal means to bear against the spacer terminal and, hence, force downwardly on the upper magnet unit 57 to maintain the same in place. In addition, the space between the upper magnet and insulating block contains an insulating filler poured in while liquid and allowed to harden.

The operation of this form of pressure gauge is similar to the modification shown in Figs. 17 through 21, so that its operation will be described in connection therewith.

Attention is now directed to Figs. 17 through 21. This structure utilizes the coupling 51 which is, however, attached to a sleeve 71. The sleeve 71 receives a magnet unit 72 which comprises a mandrel 72a, a pole piece 72b at its upper end forming in part a continuation of the mandrel but insulated therefrom, a pole ring 72c at its lower end, and a solenoid 72d wound thereabout. A shell 72e is fitted around the solenoid but is spaced from the periphery of the pole piece 72b. The pole piece, shell, and pole ring are preferably formed of magnetic material. A retainer ring 73 screw-threaded into the lower end of the sleeve 71 supports the magnet unit.

The mandrel 72a receives an armature 74 having a check valve portion 74a at its lower end and a piston tip 74b continuing therefrom. The check valve engages a check valve seat member 75 which is screw-threaded into the outer chamber passage 51b of the coupling 51. The armature 74 is provided with a passage 74c extending from its upper end to a point above the check valve portion 74a. Also, the pole piece 72b is provided with a passage therethrough so that communication may be had between the inner chamber B and the upper end of the magnet unit.

The upper end of the magnet unit receives an insulating cap 76 which supports an eccentrically positioned, upwardly directed terminal prong 77.

The upper end of the sleeve 71 is screw-threaded onto the lower extremity of a coupling member 78. The upper end of the outer chamber shell 11 is likewise screw-threadedly connected with the coupling 78. The coupling 78 is provided with a central bore 78a extending the length thereof, a connector receiving bore 78b disposed in alinement with the terminal prong 77, and a passage 78c intersecting its upper end but extending laterally at its lower end to communicate with the space between the shell 71 and tube 11.

The bore 78b receives a connector 79 comprising a rod 79a having socket members 79b at each extremity which are spaced from the walls of the bore 78b by insulating ferrules 79c. The lower socket 79b is adapted to receive the terminal prong 77.

The upper end of the coupling 78 is connected to a cylindrical housing 80 which receives the upper magnet unit 72 which is identical to the lower magnet unit except that a thicker shell 72f is substituted for the shell 72e. An insulating block 81 is secured to the lower end of the upper magnet unit; said block is provided with a central aperture and is recessed to embrace the bore 78a and passage 78c. A terminal prong 82 depends from the insulating block and fits the upper socket 79b of the connector 79. The upper end of the upper magnet unit receives an insulating cap 84 in which is mounted a central terminal prong 85. As shown in Fig. 20, the shell 72f may be channeled to receive a lead 86 extending from the terminal prong 82 to 85. Also a conductor 87 extends from the upper magnet unit to said terminal prong 85.

The terminal prong 85 fits into the body 88a of a yieldable contactor 88 which is mounted in an insulating block 89 clamped between a shoulder 80a of the housing 80 and a retainer ring 90 screw-threaded into the upper end of the housing. The body 88a of the contactor is provided with a cap 88b which retains a terminal 88c in a socket formed within the body 88a, and in which is mounted a spring 88d.

The upper magnet unit is also provided with an armature 74 having a check valve 74a which engages a check valve seat member 75 screw-threaded into the upper end of the central bore 78a. Each armature 74 is provided with a contact spring 74d which, after a predetermined movement, engages the lower end of the corresponding pole piece 72b to ground the circuit through the corresponding magnet unit.

It should be noted that the magnet units do not have to be sealed in place, and it is preferred that they are not so that pressures will be equal on both sides.

Operation is best indicated diagrammatically in Fig. 21, in which it is clear that the lowermost check valve controls flow from chamber A to chamber B, while the uppermost check valve controls flow from chamber B to chamber A. By providing the upper and lower magnets with solenoids of different resistances, it is a simple matter to determine at the surface which check valve is operating, and therefore whether the pressure is increasing or decreasing.

The operation of the construction shown in Fig. 13 is substantially the same, the only difference being that the check valves of the arrangement in Fig. 13 may be made lighter and more sensitive than the arrangement in Figs. 17 and 18; however, it is of course possible to counterbalance the combined armatures and check valves of Figs. 17 and 18, as shown in connection with the first described structure in Fig. 3. A further difference exists in that the structure shown in Fig. 13 is more compact; whereas, in Figs. 17 and 18, the parts are arranged for greater ease of assembly and disassembly.

My present invention also embraces a novel method of measuring pressure, consisting essentially in metering fluid from one chamber to another each time a predetermined pressure differential exists and recording electrically such metering operations, so that the ultimate pressure may be obtained by multiplying algebraically said predetermined pressure differential with the number of times such pressure differential has been established.

Though I have shown and described a certain embodiment of my invention and a method of gauging pressure, I do not wish to be limited to the arrangement or method herein disclosed but desire to include in the scope of my invention such constructions, combinations, arrangements, and methods as are embraced in the appended claims.

I claim:

1. A well fluid pressure gauge comprising: an expansible chamber; valve means for subjecting said expansible chamber to well fluid pressure, said valve means being responsive to a predetermined unitary pressure differential between the well fluid pressure and said expansible chamber pressure; means for holding said valve means open to permit the pressures to equalize and thereafter to close, whereby said valve means is repeatedly operable in accordance with the occurrence of said unitary pressure differential; and an instrumentality for determining the number of operations of said valve means.

2. A well fluid pressure gauge comprising: an expansible chamber; a pressure responsive apparatus for exposing the expansible chamber to well fluid pressure including a valve means for permitting flow of fluid into and out of said expansible chamber and electrical means for holding said valve means open; and an instrumentality in circuit with said electrical means for determining each operation thereof.

3. A well fluid pressure gauge comprising: a first liquid-filled chamber having a flexible diaphragm constituting one of its walls for separating the liquid in said chamber from the well fluid while subjecting the same to the pressure thereof; a second liquid-filled chamber having a yieldable wall; and a valve structure for controlling transfer of liquid between said chambers including means responsive to a predetermined pressure differential between said chambers to establish communication therebetween, and electrical means for maintaining such communication to permit equalizing of the pressures in the chambers.

4. A well fluid pressure gauge comprising: a first liquid-filled chamber having a flexible diaphragm constituting one of its walls for separating the liquid in said chamber from the well fluid while subjecting the same to the pressure thereof; a second liquid-filled chamber having a yieldable wall; a dual valve structure for controlling transfer of liquid in either direction between said chambers including means dependent upon a predetermined pressure difference to establish communication, electrical means for maintaining such communication, and an instrumentality incorporating said electrical means for determining the number of times said electrical means operates.

5. A well fluid pressure gauge comprising: a first liquid-filled chamber having a flexible diaphragm constituting one of its walls for separating the liquid in said chamber from the well fluid while subjecting the same to the pressure thereof; a second liquid-filled chamber having a yieldable wall; a first check valve for controlling flow of liquid from the first to the second chamber; a second check valve for controlling flow of liquid from the second to the first chamber; said check valves responsive to a predetermined pressure differential between said chambers; and electrical means for holding each check valve in an open position and incorporating means responsive to movement of each of said check valves to complete a circuit therethrough.

6. A well fluid pressure gauge comprising: a first liquid-filled chamber having a flexible diaphragm constituting one of its walls for separating the liquid in said chamber from the well fluid while subjecting the same to the pressure thereof; a second liquid-filled chamber having a yieldable wall; a first check valve for controlling flow of liquid from the first to the second chamber; a second check valve for controlling flow of liquid from the second to the first chamber; said check valves responsive to a predetermined pressure differential between said chambers; electrical means for holding each check valve in an open position and incorporating means responsive to movement of each of said check valves to complete a circuit therethrough; and an instrumentality in circuit with said electrical means for determining operation thereof, said electrical means having different resistances whereby said instrumentality and electrical means serve to determine which of said check valves is functioning and the number of times of operation.

7. A gauge for measuring well pressure comprising: an expansible chamber; a device for controlling flow of fluid into and out of said chamber including means responsive to a predetermined pressure differential between the well fluid pressure and said chamber pressure for permitting flow of fluid into or out of said chamber to equalize said pressures; means for determining the direction of flow with respect to said chamber, said means incorporating circuit completing devices and distinguishable elements associated with said flow-controlling device for registering the flow of fluid and its direction with respect to said chamber; and an instrumentality externally of the well bore electrically connected with said elements for determining the registration of said elements.

8. A well fluid pressure gauge comprising: a first liquid-filled chamber having a flexible diaphragm constituting one of its walls for separating the liquid in said chamber from the well fluid while subjecting the same to the pressure thereof; a second liquid-filled chamber having a yieldable wall; a first check valve for controlling flow of liquid from the first to the second chamber; a second check valve for controlling flow of liquid from the second to the first chamber; said check valves responsive to a predetermined pressure differential between said chambers; electrical means for holding each check valve in an open position and incorporating distinguishable elements for completing electric circuits therethrough upon operation of said valves; and an instrumentality for determining completion of said circuits.

9. A gauge for measuring well fluid pressure comprising: a first liquid-filled chamber having a flexible diaphragm constituting one of its walls for separating the liquid in said chamber from the well fluid while subjecting the same to the pressure thereof; a second liquid-filled chamber having a yieldable wall; a dual valve structure for controlling transfer of liquid in either direction between said chambers including means dependent upon a predetermined pressure difference to establish communication and means for retarding closing of such communication to permit equalization of pressures between said chambers; distinguishable electrical resistances incorporated in said retarding means; and an instrumentality for measuring said resistances.

10. A gauge for measuring well fluid pressure comprising: a first liquid-filled chamber having a flexible diaphragm constituting one of its walls for separating the liquid in said chamber from the well fluid while subjecting the same to the pressure thereof; a second liquid-filled chamber having a yieldable wall; a check valve interposed between said chambers and responsive to a predetermined pressure differential therebetween; other valve means responsive to the pressures in said chambers for reversing the position of said check valve with respect thereto, whereby said check valve controls transfer of liquid in either direction; and means for delaying closure of said check valve to permit equalization of the pressures in said chambers.

11. A gauge for measuring well fluid pressure comprising: a first liquid-filled chamber having a flexible diaphragm constituting one of its walls for separating the liquid in said chamber from the well fluid while subjecting the same to the pressure thereof; a second liquid-filled chamber having a yieldable wall; a check valve interposed between said chambers and responsive to a predetermined pressure differential therebetween; other valve means responsive to the pressures in said chambers for reversing the position of said check valve with respect thereto, whereby said check valve controls transfer of liquid in either direction; means for delaying closure of said check valve to permit equalization of the pressures in said chambers; an electrical circuit including a resistance incorporated in said delaying means, a second resistance connected with said other valve adapted to be connected or disconnected from said circuit depending upon the position thereof, a switch responsive to movement of said check valve for closing said circuit, and an instrumentality for indicating the resistance of said circuit to determine the opening of said check valve and the direction of flow between said chambers.

WALTER T. WELLS.